July 14, 1970     K. THURAUF     3,520,528

SPIKE INSERTING MACHINE

Filed March 1, 1968     3 Sheets-Sheet 1

INVENTOR
Karl Thurauf
By
Watson, Cole, Grindle & Watson
Attys.

United States Patent Office 3,520,528
Patented July 14, 1970

3,520,528
SPIKE INSERTING MACHINE
Karl Thürauf, Winterbach, Kreis, Waiblingen, Germany, assignor to Firma OKU Automatik Otto Kurz, Winterbach, Kreis, Waiblingen, Germany
Filed Mar. 1, 1968, Ser. No. 709,720
Claims priority, application Germany, Mar. 7, 1967, O 12,352
Int. Cl. B23q 3/00; B25e 7/00
U.S. Cl. 269—289                         8 Claims

ABSTRACT OF THE DISCLOSURE

An apparatus for holding a vehicle tire of any size or type and for adjusting it to different angular or rotary positions to permit spikes to be inserted at any desired points of the tread surface of the tire.

---

The present invention relates to an apparatus for holding a vehicle tire and adjusting it to different angular and rotary positions to permit work to be carried out on its outer surface, and more particularly it relates to a machine for inserting spikes or the like into vehicle tires.

Such a machine generally comprises a spike feeding and inserting apparatus and underneath the latter a tire support including a supporting head for bracing the tire on the inside when spikes are inserted into holes in the tread surface of the tire by means of the inserting apparatus.

The known machines of this type are provided with a supporting head of a width and shape in conformity with a part of the inner wall of the tire. Therefore, if such a machine is to be used for inserting spikes into tires of different types and sizes, it is necessary at each change from one kind of tire to another also to exchange the supporting head so as to comply with the particular tire to be worked upon. Considering the large number of different types and sizes of tires which may have to be studded with spikes, it is obvious that a very large number of different supporting heads has to be held available and that therefore the cost of such a machine including its many supporting heads is very high. Also, the time required for selecting the proper supporting head for each type or size of tire and for exchanging these heads increases the cost of studding each tire.

It is an object of the present invention to provide a tire support which is suitable for supporting a vehicle tire of any size or type and permits such a tire to be easily turned and swiveled so as to place any of the holes which have been provided in the tread surface of the tire for the insertion of spikes in accurate axial alignment with the feed channel of the spike inserting apparatus.

A feature of the invention for attaining this object consists in making the supporting head of a width considerably smaller than that of the tire and in providing a pivotable rocker which is adapted to support the tire on its beads and the pivot axis of which at least approximately intersects the axis of the supporting head or an extension of this axis. The supporting head is preferably made of such a small width and short length that it will only support a very small area of the inner wall of the tire which is substantially in alignment with the hole in the tread surface of the tire into which a spike is to be inserted. Because of such a narrow width of the supporting head it is possible to swivel the tire so that spikes may be inserted into holes which are provided at any point of the entire width of the tread surface and each of these points will be accurately braced by the supporting head engaging upon the inner wall of the tire. The weight of the tire is taken up by the supporting rocker which is preferably spaced from the upper end of the supporting head at such a distance that before a spike is inserted, a small space remains between this end of the supporting head and the inner wall of the tire so that the tire may be easily swiveled and turned relative to the supporting head and without any friction thereon and will not be pressed against the supporting head until the spike is being inserted.

Another feature of the invention consists in providing suitable means for adjusting the supporting head in a vertical direction by mounting the actual head on the upper end of a tubular member in which a threaded spindle is located on which at least one rocker is pivotably mounted which extends substantially parallel to the axis of the tire resting on this rocker.

Another feature of the invention consists in providing the tubular member carrying the supporting head with a pair of diametrically opposite axial slots through which an axle extends which is provided with a central tapped bore into which the threaded adjusting spindle is screwed so as to be slidable along this spindle when the latter is turned without being able to rotate relative to the tubular member. The opposite ends of this axle serve as pivot pins on which a pair of rocker arms are pivotably mounted which are connceted to each other so as to form a rocker frame for supporting the tire to be worked upon. For considerably reducing the friction between the tire and this rocker frame, the invention further provides each rocker arm with a pair of rollers which are rotatably mounted thereon at both sides of the bearing of this arm for the respective pivot pin on the mentioned axle.

A further feature of the invention consists in securing the tubular member carrying the supporting head and containing the threaded spindle on a bearing member which permits these elements to be pivoted about an axis which is spaced from and extends parallel to the pivot axis of the rocker frame. These elements may thus be pivoted forwardly and away from the spike inserting apparatus so as to permit the tire to be easily placed over the supporting head and rested on the rocker frame, whereupon these elements with the tire thereon are pivoted to the normal operating position in which they may be locked in a fixed position.

The features and advantages of the present invention will become more clearly apparent from the following detailed description thereof which is to be read with reference to the accompanying diagrammatic drawings, in which:

FIG. 3 shows a cross section which is taken along the line III—III of FIG. 2; while FIG. 4 shows a front view of the supporting head of the machine according to FIG. 2, but on a smaller scale.

Figure 1:
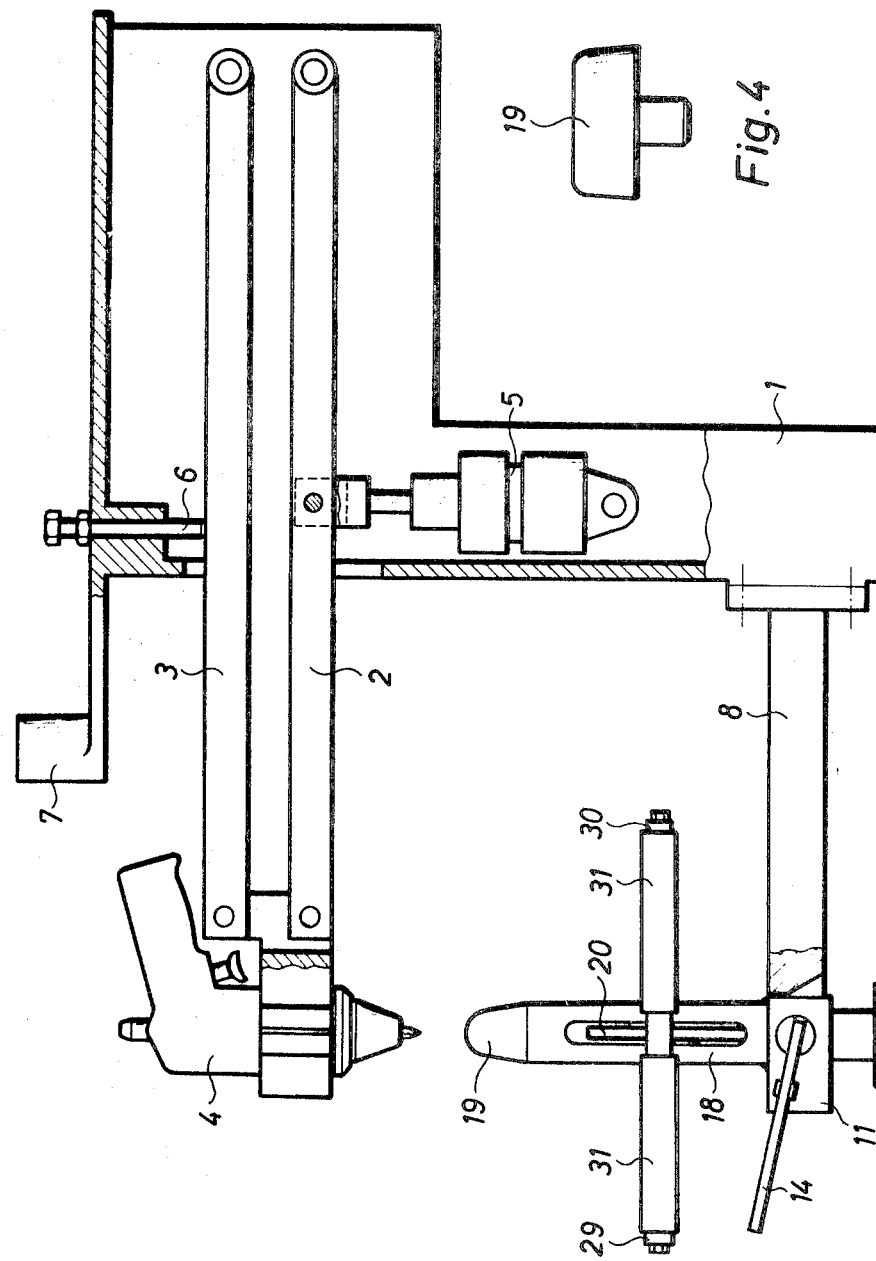
FIG. 1 shows a side view, partly in section, of the machine according to the invention for inserting spikes into automobile tires.

The spike-inserting machine according to the invention comprises a post 1 which may be mounted on a suitable base, not shown, and carries two one-armed levers 2 and 3 which are pivotably mounted on a lateral extension of this post and serve for raising and lowering a spike gun 4 by means of a double-acting cylinder 5, the piston rod of which is pivotably connected to the lever 2, while the cylinder itself is pivotably mounted on post 1. For limiting the length of the strokes of this piston rod and of levers 2 and 3, a setscrew 6 is provided on post 1. The upper end of post 1 has a projection 7 on which a spike magazine, not shown, may be mounted from which the spikes are fed to the gun 4 by means of a flexible tube.

Figure 2:
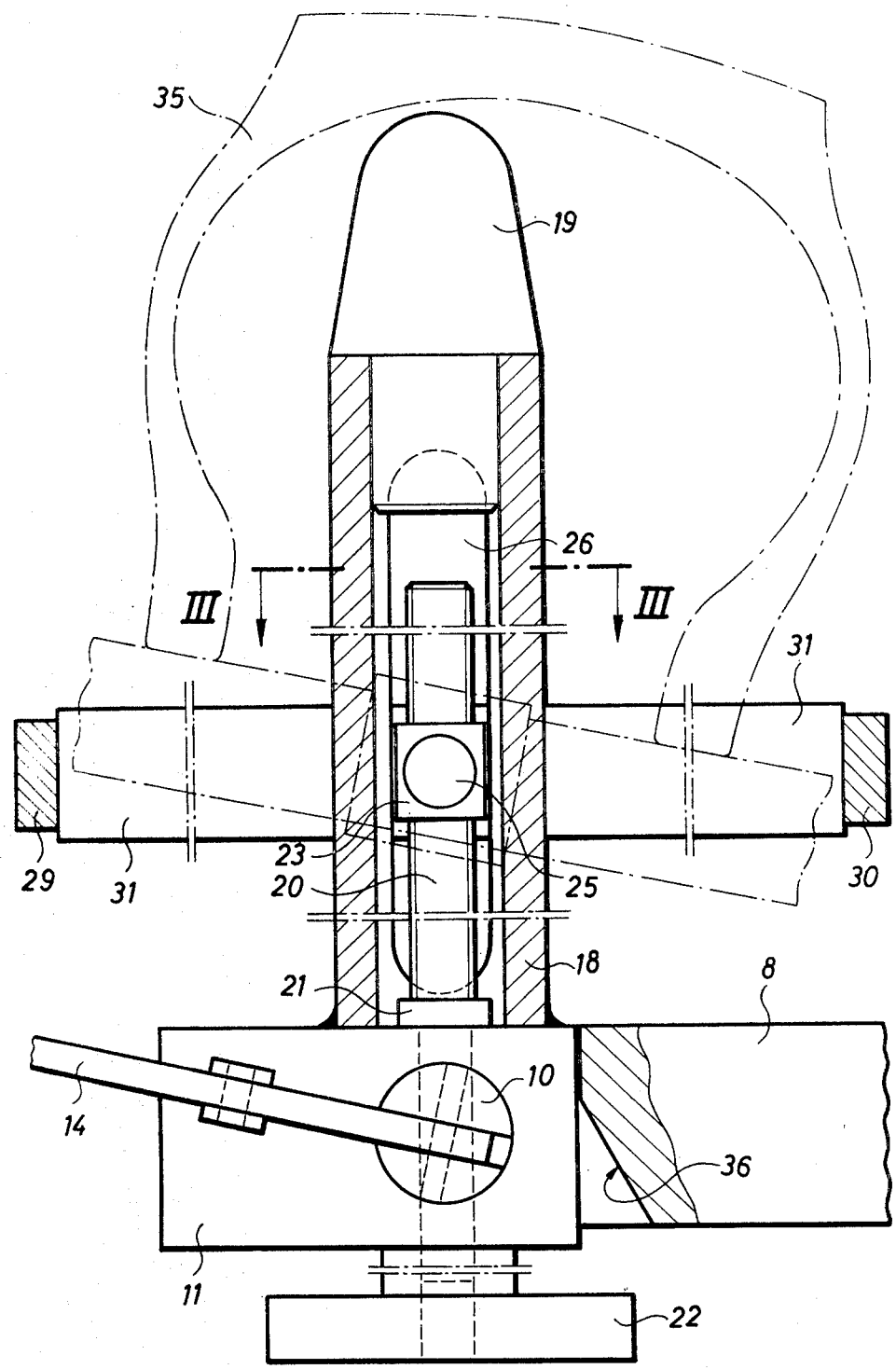
FIG. 2 shows an enlarged view, partly in section, of a part of FIG. 1.
Figure 3:
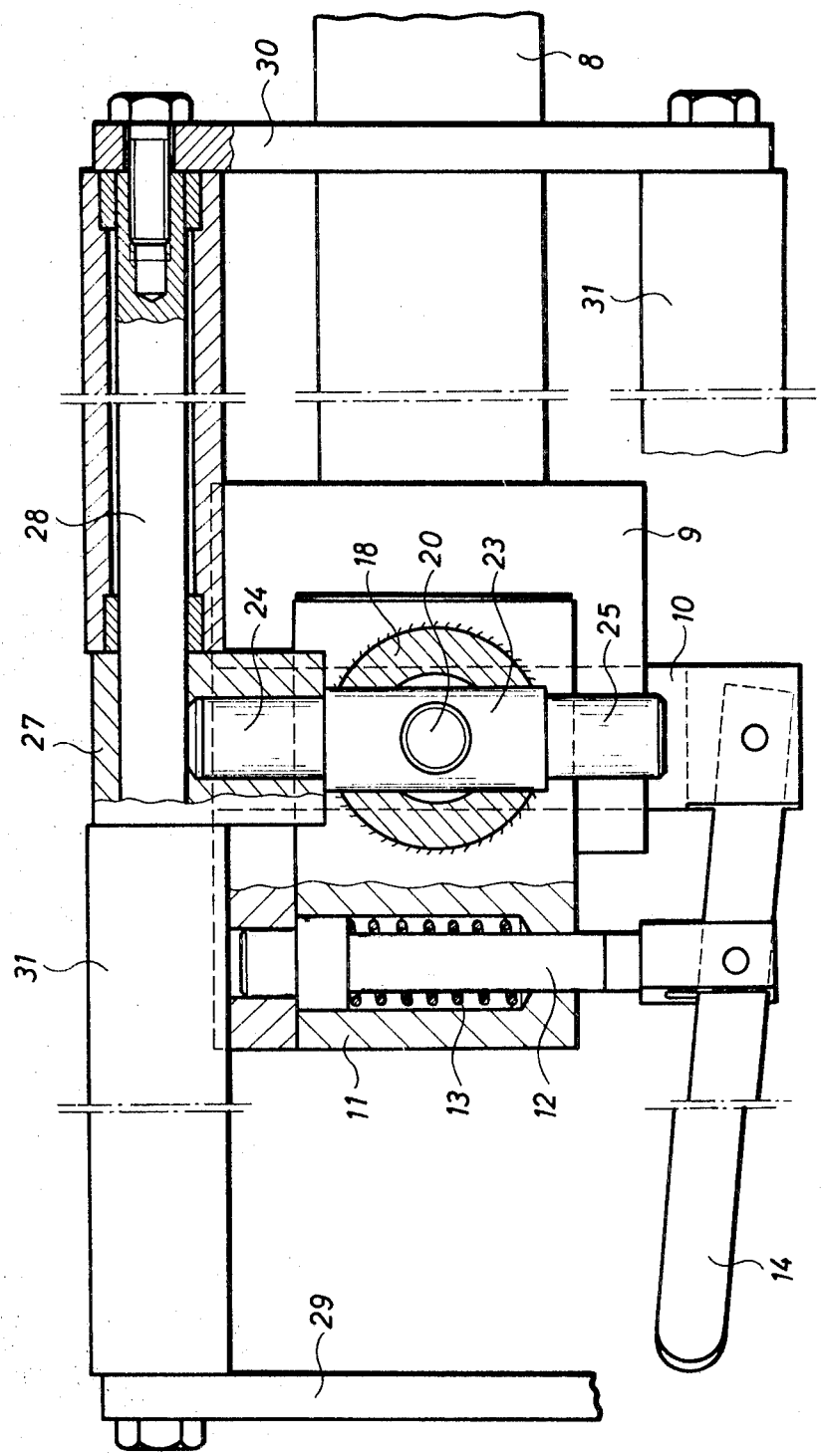

Post 1 has rigidly thereon a lateral arm 8 which carries a bifurcated bearing member 9 in which by means of a pin 10 on a bearing block 11 is pivotally mounted. The outer end of bearing block 11 as seen from arm 8 carries a locking pin 12 which is slidable therein in its axial direction and is acted upon by a spring 13 which bends to hold pin 12 in a bore in an extension of one arm of the bifurcated bearing member 9 when the bearing block 11 is located in the position as shown in FIGS. 1 to 3. For withdrawing the locking pin 12 from its bore in the arm of bearing member 9 so as to permit the bearing block to be pivoted about pin 10, a control lever 14 is pivotably connected ta one end to pin 10 and at a certain distance therefrom its locking bore and bearing block 11 is pivoted from its normal locked position by means of control lever 14, the end of locking pin 12 engages under the action of its spring 13 upon the inner surface of the extended arm of bearing member 9 so that, when bearing block 11 is pivoted back to its normal position, locking pin 12 will automatically snap back into its locking bore in the arm of bearing block 11.

On the upper side of bearing block 11 an upright tubular member 18 is secured, the upper end of which carries a work-supporting head 19 which is shown in FIGS. 2 and 4 in two different side views at right angles to each other. Bearing block 11 has a transverse bore into which the lower smooth part of a threaded spindle 20 is inserted which is rotatable within this bore and has a flange 21 resting on the upper side of bearing block 11 while on the lower side of the bearing block 11, spindle 20 carries a head or knob 22 which is secured to the spindle by a pin and by means of which the spindle may be turned. Spindle 20 is screwed into a tapped bore in an axle 23 carrying two diametrically opposite pivot pins 24 and 25 each of which projects through and is guided by the walls of a slot 26 extending in the axial direction through the wall of the tubular member 18. On each of these two pivot pins 24 and 25 a bearing member 27 is pivotably mounted which has a bore transverse to the axis of pin 24 or 25 through which a rod 28 extends. The corresponding ends of these rods 28 are connected to each other by connecting bars 29 and 30 to form a frame-shaped rocker. One each side of each bearing member 27 a tubular supporting roller 31 is rotatably mounted on rod 28. These supporting rollers 31 serve for supporting an automobile tire 35, as indicated in FIG. 2 in dot-and-dash-lines, the inner side of which is spaced from the upper side of the supporting head 19 at a distance of approximately 3 mm.

When a tire 35 is to be mounted on the apparatus, the locking pin 12 is withdrawn by lever 14 from its locking bore in the extended arm of bearing member 9 and the bearing block 11 together with the tubular member 18 and its head 19 is pivoted forwardly about an angle of approximately 30° until bearing block 11 abuts against the inclined inner surface 36 of the arm 8. After the tire 35 has been slipped over the tubular member 18 and its head 19, and rests on the rocker rollers 31, bearing block 11 is pivoted back to the position as shown in the drawings and locking pin 12 snaps automatically into its locking bore in the extended arm of bearing member 9. Rocker 27 to 31 is then adjusted in a vertical direction by turning the spindle head 22 so that a distance of approximately 3 mm. remains between the supporting head 19 and the inner surface of the tire 35.

The tire 35 is thereafter shifted on the rollers 31 and pivoted by means of the rocker to such a position that one of the holes which have been provided in the tread surface of the tire for receiving spikes will be located in line with the axis of the spike gun 4 so that when a pressure medium is then supplied to cylinder 5, the spreaders of gun 4 engage into this hole and a spike will be inserted therein, whereupon the spike gun is again lifted off the tire 35. As soon as by swiveling the rocker 27 to 31 and/or by rolling the tire 35 along the supporting rollers 31 the tire has been shifted to the proper position in which another hole therein is in alignment with the axes of gun 4, another spike may be inserted therein in the same manner as described.

When all spike have been inserted into the tire 35, lever 14 is actuated so as to unlock the locking pin 12. The supporting head 19 may then be pivoted forwardly and thus away from the spike gun 4, whereupon the tire 35 may be easily lifted off the apparatus.

Although the machine according to the invention is primarily intended for inserting spikes into tires, it may also be employed—either with or without modifications—for inserting or driving elements other than spikes into workpieces other than tires.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An apparatus for holding a vehicle tire and adjusting it to different angular and rotary positions to permit work to be carried out on its outer surface, comprising work bracing means, said means comprising a supporting head having an upper end of a width considerably smaller than the width of a tire and adapted to be applied against the inner wall thereof substantially underneath a point where work is to be carried out upon the outer surface of the tire, and tire supporting means comprising a rocker underneath the upper end of said head and pivotable about an axis substantially intersecting the longitudinal axis of said head at a substantially right angle and adapted to support said tire on its beads and to pivot said tire to different angular position relative to said supporting head.

2. An apparatus as defined in claim 1, wherein said work bracing means comprise an upright tubular member having a solid portion forming said upper end, and a threaded spindle extending within said tubular member in the axial direction thereof, said tubular member having two diametrically opposite longitudinal slots, a nutlike pivot member for said rocker threaded on said spindle within and nonrotatable relative to said tubular member and connected through said slots to a central point of said rocker for raising and lowering said rocker relative to said upper end of said supporting head.

3. An apparatus as defined in claim 2, wherein said rocker comprises a substantially rectangular frame, said nutlike member on said spindle forming an axle extending through said slots and having outer ends pivotably connected to two opposite members of said frame substantially centrally thereof.

4. An apparatus as defined in claim 3, wherein said two opposite frame memmbers form rods, and a bearing member secured to each of said rods suubstantially at the center thereof and having a bearing bore, said bores of said bearing members having a common axis extending substantially at right angles to said rods and rotatably mounted on the outer ends of said axle.

5. An apparatus as defined in claim 3, wherein said two opposite frame member form rods, further comprising tubular rollers rotatably mounted on each of said rods at both sides of said bearing members.

6. An apparatus as defined in claim 2, further comprising a base secured to the lower end of said tubular member and having a bore coaxial with said tubular member, said spindle having a smooth lower end extending through and rotatable within said bore, means on said lower end of said spindle underneath said base for turning said spindle, a fixed support, bearing means pivotably connecting said base to said support for pivoting said base together with all of said elements thereon including said supporting head and said rocker relative to said fixed support from a normal operating position to a position at an angle thereto about an axis extending substantially parallel to the pivot axis of said rocker, and releasable means for locking said base when pivoted to at least one position relative to said fixed support.

7. An apparatus as defined in claim 6 wherein said releasable means comprise a locking bolt and said fixed support has at least one locking recess, a lever pivotably connected to said base for pivoting the same about its axis and also pivotably connected to said locking bolt for withdrawing the same from said locking recess, and spring means acting upon said locking bolt for inserting said locking bolt automatically into said locking recess when said base is pivoted at least to said normal operating position.

8. An apparatus for holding a vehicle tire and adjusting it to different angular and rotary positions to permit work to be carried out on its outer surface, work bracing means comprising a normally upright tubular member having a substantially solid base secured to its lower end and a solid work supporting head secured to its upper end and having a width considerably smaller than the inner width of a tire and adapted to be applied upon the inner wall of said tire underneath a point where a spike is to be inserted by said inserting means into the tread surface of the tire, means for pivotably connecting said base to the other end of said arm to permit said bracing means to be pivoted from a normal substantially vertical position in alignment with said spike inserting axis to a fixed oblique position away from said upright, releasable means for locking said bracing means at least in said normal position, said base having a bore coaxial with said tubular member, said tubular member having a pair of diametrically opposite slots extending in the axial direction thereof, a spindle having a threaded upper part within said tubular member and a smooth lower part extending through and projecting from the lower side of said base and being rotatable but non-slidable within said bore, means on the lower projecting end of said spindle for turning said spindle, and tire supporting means comprising a substantially rectangular frame, said frame comprising two opposite substantially parallel rods and means for connecting the ends of said rods, a bearing member secured to the center of each of said rods and having a bearing bore at right angles to said rod and coaxial to the bearing bore of the other rod, an axle having ends rotatable within said bearing bores so as to permit said rocker to pivot about said axle within a substantially vertical plane, said axle traversing said tubular member and extending through said slots and being guided by the side walls thereof, said axle having a central tapped bore within and substantially coaxial with said tubular member, said spindle being screwed into said tapped bore so that, when said spindle is turned, said axle together with said rocker is raised or lowered regardless of the position to which said rocker is pivoted on said axle relative to said bracing means, and tubular rollers rotatably mounted on each of said rods at both sides of said bearing members.

References Cited

FOREIGN PATENTS 1,419,187 10/1965 France.

OTHELL M. SIMPSON, Primary Examiner

D. R. MELTON, Assistant Examiner

U.S. Cl. X.R.

29—212, 235; 227—154